United States Patent [19]

Breznay

[11] 4,175,949
[45] Nov. 27, 1979

[54] PROCESS FOR PERISHING WASTE RUBBER MATERIALS, ESPECIALLY WORN OUT MOTOR VEHICLE RUBBER TIRES BY RECOVERING THEIR COMPONENTS FOR INDUSTRIAL PURPOSES

[76] Inventor: Endre Breznay, Juhász Gyula u. 6, Budapest H1039, Hungary

[21] Appl. No.: 929,276

[22] Filed: Jul. 31, 1978

[30] Foreign Application Priority Data
Aug. 15, 1977 [HU] Hungary .............................. BE 1305

[51] Int. Cl.$^2$ ............................................ C21B 5/00
[52] U.S. Cl. ......................................... 75/42; 75/44 S
[58] Field of Search ............................ 75/41, 42, 44 S

[56] References Cited
U.S. PATENT DOCUMENTS

| 3,812,620 | 5/1974 | Titus et al. ............................ 75/44 S |
| 3,890,141 | 6/1975 | Crane et al. ........................... 75/44 S |
| 4,014,681 | 3/1977 | Rhinehart ............................. 75/44 S |
| 4,078,914 | 3/1978 | Gold ......................................... 75/42 |

FOREIGN PATENT DOCUMENTS
1403187  8/1975  United Kingdom ......................... 75/24

Primary Examiner—M. J. Andrews

[57] ABSTRACT

A process for perishing waste rubber materials, especially worn out motor vehicle rubber tires by recovering their components for industrial purposes wherein waste rubber material is admixed to the charge matter for the blast furnace and loaded together with the charge matter into the blast furnace.

As a result of physical and chemical processes going on in the blast furnace the supplied waste rubber material gets decomposed and the so obtained components have a favorable effect on the pig iron manufacturing process.

5 Claims, 1 Drawing Figure

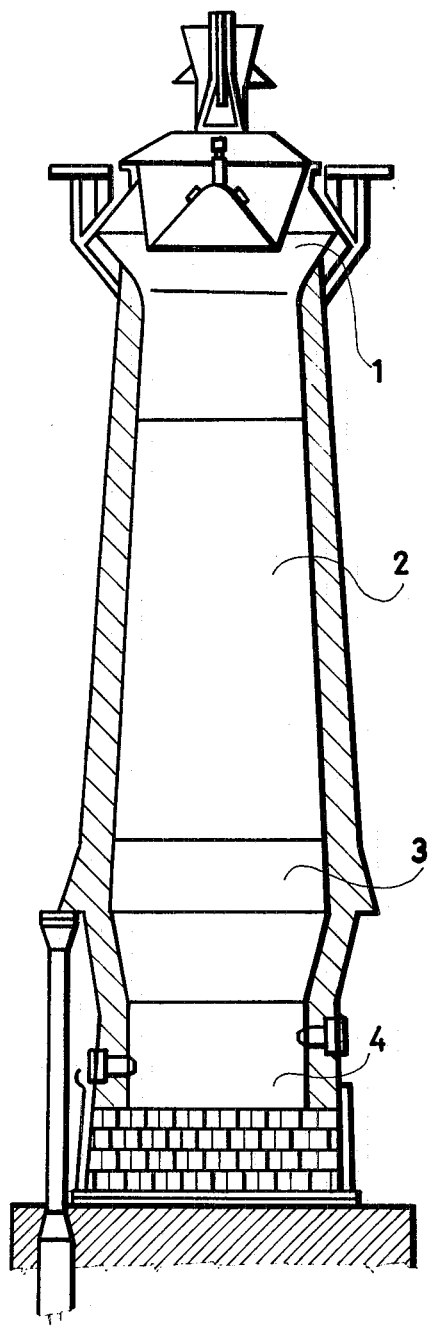

PROCESS FOR PERISHING WASTE RUBBER MATERIALS, ESPECIALLY WORN OUT MOTOR VEHICLE RUBBER TIRES BY RECOVERING THEIR COMPONENTS FOR INDUSTRIAL PURPOSES

The invention relates to a process for perishing waste rubber materials, especially worn out motor vehicle rubber tires by recovering their components for industrial purposes.

As a result of the advance in engineering the amount of waste rubber materials arising all over the world has been year by year increasing, and this quantity is made up particularly of the worn out motor vehicle tires. The goods made of rubber not being expected to be able to decompose in natural way, therefore the amount of waste rubber materials in an ever increasing quantity causes environment pollution, their liquidation has become an important social and ecological task.

Until recently there have been already quite a lot of well-known solutions to perish waste rubber materials and to recover them for industrial purposes.

According to one of the well-known methods, the goods made of rubber will be disintegrated by mechanical breaking, moreover in order to liquidate the plies they will be subjected to a chemical treatment, then the rubber crumble obtained by this way will be used as additive, e.g. for concrete aggregate in the building and construction trade and for other purposes.

By this solution the embedded steel-cord reinforcement being used ever increasingly in rubber tires /e.g. radial tires/ renders difficult the disintegration process. Furthermore employed chemical treatment is also rather expensive and the utilization of the so obtained rubber crumble is limited by certain economic and quantitative considerations. The total rubber crumble quantity thus utilized amounts hardly to the 1 to 2 percent out of the arising waste material, per annum even in the most advanced industrial countries.

There are known methods according to which the waste rubber materials are incinerated, resp. reduced to the components of the original compound by means of heat effect. The establishment of such equipments involves very high investment costs, and on the other hand, the conditions for observing the ecological regulations, in consequence of the requirements to neutralize the by-products resulting from combustion make the incineration technique uneconomical. When considering a heavy-duty rubber waste incinerator plant to be capable of operating economically, the waste material consumption will obviously come to such a great totalquantity that in order to utilize the full capacity of an equipment of this kind the collection of waste rubber materials should be organized by the delivery from an immense large district involving very long distances in transportation, and this criterion would be also a factor increasing the costs.

There has not been proposed an economical method which could reduce the components of the compounds of waste rubber materials, and could industrially make use of these components. The engery consumption of the vacuum-carbonization process is rather great, moreover separating and deflecting the arisen components involves some problems in design, and observing the ecological regulations requires expensive investments.

Similarly the procedure relating to the sub-zero treatment by liquid hydrogen, and the subsequent pulverization as well as the solution for separating and utilizing the powder is also uneconomical.

The well-known solutions do not allow the arisen waste rubber materials to be perished in a profitable way, and the valuable components in rubber compounds to be recovered for industrial purposes. The utilization for additives cannot be considered as reclaiming the valuable material components, because the iron, the carbon and hydrocarbons included in such rubber materials do not return any more in their original quality into the industrial process.

Unlike paper, textile, metalworking and other industries rubber manufacturing is based on an open loop circulation, i.e. the used waste materials cannot be fed back in the form of row materials into the manufacturing process.

The still unsolved problem of the extensive liquidation of waste rubber materials might be explained by the fact, that the investment expenditures required for the application of the recently available methods are usually beyond the financial capabilities of the society.

The object of the invention is to provide a method which can perish waste rubber materials economically and practically without the need of any additional expenditures, and can feed back the valuable material components included in the waste rubber material into an industrial manufacturing process.

The basic concept of the present invention lies in the principle recognizing the fact, that chemical and physical processes going on during the pig iron manufacture in the blast furnace are suitable for decomposing the waste rubber materials as well, and the disintegration products resulting from the pyrolythic decomposition are essentially identical with the stock materials loaded into the blast furnace and being present there, thus the charging of waste rubber materials in the blast furnace can not deteriorate the iron manufacturing process.

Therefore the invention provides a method to perish waste rubber materials, especially worn out motor vehicle rubber tires, comprising the steps of admixing waste rubber materials to the charge of the blast furnace and loading the so obtained mixture into the blast furnace. Subsequently the waste rubber materials will take active part in the process going on in the blast furnace and will be broken up to their components, and will exert a favourable influence on the pig iron manufacture.

In order to promote the charging and the transport of waste rubber materials, it is advantageous to disintegrate these wastes by mechanical breaking prior to their admixing. For reasons of suitability the weight of the disintegrated pieces should be kept below 2 kgs, i.e. advantageously between 0.3 and 1 kg.

In the blast furnace from the waste rubber materials about 40 to 60 weight percent will proceed to carbon which contributes to the coke quantity. According to this equivalent carbon content a good opportunity presents itself to reduce the quantity of coke intended for loading to the charge matter and/or of fuel oil to be supplied into the furnace.

Preferably the quantity of consumption in gas used for heating up the air heaters /Copwer stoves/ can be reduced due to the utilization of the heat energy content obtained by burning the combustible blast furnace gas resulting from waste rubber materials.

In order to provide the undisturbed operation run during the pig iron manufacture process, the quantity of waste rubber materials added to the charge matters compared to the amount of produced pig iron will be kept up to a level of 20 percent. This percentage proportion depends—considerably—on the quality of the iron ore being used as well as on the other components of the charge material, and its optimum value should be experimentally determined within the indicated limit.

The technique according to the present invention has the advantage of recycling the waste rubber materials into the manufacturing process, and it economizes the operation of the blast furnace, its implementation, however, does not require any kind of supplementary investment. The iron-processing furnaces are normally arranged regionally in a densely scattered pattern in the industrial countries, therefore the collection of waste rubber materials has to be organized only for relatively small regions /i.e. for each iron-processing furnace district/ thus enabling the transport and storage costs to be lowered.

Considering that the pig iron manufacture output exceeds substantially that of rubber production everywhere, the average level of 10 percent of waste rubber materials related to the pig iron amount represents a quantity which seems not to be exceeded. This means furthermore that the available iron-processing furnaces are suitable to perish all the waste rubber materials being arisen without establishing any supplementary investment.

By putting into practice the procedure relating to the invention, the basic problem, namely the environment pollution resulting from the presence of waste rubber materials could be simply, and at the same time profitably solved.

Further on, the invention will be illustrated in detail by demonstrating some examples according to the drawing representing the simplified sectional view of the blast furnace.

After collecting the waste rubber materials they will be prepared for transferring. This preparation is a mechanical disintegration where pieces weighing about 0.3 and 1 kp rise from waste rubber materials as a result of this breaking process. After finishing the disintegration, waste rubber materials being available in a more suitable form for handling due to the better use of volume may be transferred to the blast furnace. Disintegrated waste rubber materials having been transferred to the blast furnace will be carried to the throat of iron-processing furance and then there stockpiled.

Thereafter waste rubber materials get into the burden-preparing equipment and their process does not require any more particular treatment.

In the burdening equipment the charge materials will be prepared. During the preparation waste rubber materials get admixed to other components of burden matter.

Loading the burden matter is an integral part of the regular work process being carried out in the blast furnace. During this process the waste rubber materials admixed to the charge materials, together with the other components of burden matter get into the enclosed process area of the blast furnace as well.

On charging platform 1 representing the initial stage within the process area of the furnace, waste rubber materials get warm, together with other components and the pyrolythic decomposition of waste matter starts at a temperature level of 200°–300°C.

This work process continues in shaft 2, and when the temperature of the charge materials reaches the level of 500°–700° C., the complete decomposition of waste matter will be finished. The disintegration products resulting from waste rubber materials when using refuse of average motor vehicle tires are as follows:
  steel, carbon hydrocarbons of various atomic numbers, such as particularly methane, carbon dioxide, carbon monoxide, hydrogen sulfide.

The gaseous components of the disintegration products get mixed with the blast furnace gas and leave together the blast furnace via gas conduits. The remaining residual solid parts will pass on together with the burden material and will take active part in the metallurgical process.

The steel component of the waste material gets enriched with carbon, molten and being added to the pig iron materials from melting band 3, at hearth 4.

Carbon resulting from the waste rubber material takes active part in the reduction process of iron ore, similarly to the coke, while developing heat.

The quantitative characterisitics of the process going on in the blast furnace, both with and without adding waste rubber materials can be summarized as follows:
1. For manufacturing 1 ton of pig iron without the addition of waste rubber materials to the charge of the hot blast, there are required:
   2 tons of iron ore in medium quality,
   1 ton of blast furnace coke /with a sulphur content about 1%/, and
   0.5 ton of additive for slag-former matter /coarse limestone/.
2. For manufacturing 1 ton of pig iron, when waste rubber material is added to the charge of the hot blast, there are required:
   2 tons of iron ore in medium quality,
   0.95 ton of blast furnace coke /with a sulphur content about 1%/,
   0.5 ton of additive for slag-former matter /coarse limestone/, and
   0.1 ton of waste rubber materials /iron content about 1%, sulphur content about 1%/;
and the partial component of steel included in the waste rubber material increases the pig iron output from 1 ton ton to a level of 1.01 tons.

As a result of the comparason it can be seen, that due to the addition of the 10 percent waste rubber material 5 percent less coke quantity is required and on the other hand the pig iron production output increases by 1 percent. The reason of the reduced coke quantity can be explained by the presence of carbon resulting from the pyrolysis of waste rubber materials. Thus the specific fuel consumption level of the so charged blast furnace can be improved from the ratio of 1:1 to that of 1.01:0.95.

These values can actually be other than exemplified above, and the specific fuel consumption will depend on the quality of the iron-ore, as well as on the amount and composition of the waste rubber material, but the specific fuel comsumption will always be better, as if waste rubber material were not be added.

The combustion heat of the blast furnace gas increases about by 7 to 8 percent due to the presence of hydrogen and other kinds of gases with hydrocarbonic content resulting from the waste rubber material. Accordingly the natural gas input required for heating up the air heaters /Copwer stoves/ can also be reduced.

Supposing, that 10 percent waste rubber material compared to the pig iron bulk is continuously supplied in the process, having e.g. a pig iron manufacturing capacity of 300,000 tons per annum, then the blast furnace consumes 30,000 tons of waste rubber material per annum. In this case the pig iron manufacturing output increases by 3,000 tons per annum and the coke consumption is reduced by 15,000 tons per annum. Simultaneously about 5 percent of the heating gas can be saved.

The above figures show that the waste rubber material which has been considered so far as a matter of no value, ceased to cause environment pollution, and has become one of the secondary industrial row materials representing considerable value. This can be achived according to the invention without the need of any large scale and expensive investment.

What is claimed is:

1. In a process for producing pig iron by heating, in a blast furnace, a charge containing iron ore, coke and a slag forming additive, to produce said pig iron and blast furnace gas, wherein the improvement comprises, adding waste rubber material to said charge prior to introduction of the charge into the blast furnace and in an amount sufficient to permit reduction of the specific amount of coke employed in said charge to produce a unit of pig iron and sufficient to increase combustion of the blast furnace gas, said waste rubber material being added in an amount less than 20% of the produced pig iron.

2. The process as claimed in claim 1, characterized by the step of breaking the waste rubber material into pieces weighing at most 2 kg-s prior to adding same to the charge material.

3. The process as claimed in claim 1, wherein said waste rubber material is comprised of pieces weighing from 0.3 to 1 kg-s.

4. The process as claimed in claim 1, characterized by the step of reducing the quantity of coke and/or fuel oil supply in the blast furnace according to the equivalent carbon content of the admixed waste rubber material.

5. The process as claimed in claim 1, characterized by the step of reducing the quantity of the gas used for heating up the air heaters of the blast furnace by the amount of the combustible gas components delivered from the waste rubber material.

* * * * *